United States Patent
Onuki

(10) Patent No.: US 10,650,503 B2
(45) Date of Patent: May 12, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Kenji Onuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 15/975,620

(22) Filed: May 9, 2018

(65) Prior Publication Data

US 2018/0336670 A1 Nov. 22, 2018

(30) Foreign Application Priority Data

May 17, 2017 (JP) .................. 2017-098377

(51) Int. Cl.
*G06T 5/00* (2006.01)
*G06T 5/40* (2006.01)
*G06T 7/50* (2017.01)

(52) U.S. Cl.
CPC .............. *G06T 5/009* (2013.01); *G06T 5/007* (2013.01); *G06T 5/40* (2013.01); *G06T 7/50* (2017.01); *G06T 2207/10028* (2013.01); *G06T 2207/20208* (2013.01)

(58) Field of Classification Search
CPC ........... G06T 5/009; G06T 5/007; G06T 5/40; G06T 7/50; G06T 2207/10028; G06T 2207/20208
See application file for complete search history.

(56) References Cited

U.S. PATENT DOCUMENTS

| | | | | |
|---|---|---|---|---|
| 2003/0053690 A1* | 3/2003 | Trifonov | ................. | G06T 5/009 382/168 |
| 2012/0113130 A1* | 5/2012 | Zhai | ....................... | G06T 5/008 345/589 |
| 2012/0249830 A1* | 10/2012 | Tsubaki | .................. | G06T 5/008 348/229.1 |
| 2014/0247870 A1* | 9/2014 | Mertens | ................. | H04N 19/46 375/240.08 |
| 2014/0267841 A1* | 9/2014 | Sasaki | .................. | H04N 5/2355 348/255 |
| 2016/0037046 A1* | 2/2016 | Nashizawa | ........ | H04N 5/2355 348/229.1 |

(Continued)

FOREIGN PATENT DOCUMENTS

| | | |
|---|---|---|
| JP | 2008-067071 A | 3/2008 |
| JP | 2011-175529 A | 9/2011 |

*Primary Examiner* — Ping Y Hsieh
(74) *Attorney, Agent, or Firm* — Canon USA, Inc. IP Division

(57) ABSTRACT

An image processing apparatus obtains distance information indicating a distance to each of one or more objects of an image, performs grouping of the one or more objects in accordance with the distance to each object, extracts a plurality of object regions of the image in accordance with the grouping, and determines, in accordance with a number of the plurality of object regions extracted by the extraction unit, whether to perform tone conversion by applying a same tone characteristic to the image as a whole or to perform tone conversion by applying different tone characteristics for respective regions of the image.

12 Claims, 12 Drawing Sheets

(56) References Cited

U.S. PATENT DOCUMENTS

| | | | |
|---|---|---|---|
| 2016/0127630 A1* | 5/2016 | Kitajima | H04N 5/2351 |
| | | | 348/370 |
| 2016/0366386 A1* | 12/2016 | Douady-Pleven | G06T 3/4015 |
| 2017/0094242 A1* | 3/2017 | Yamaguchi | H04N 5/2351 |

* cited by examiner

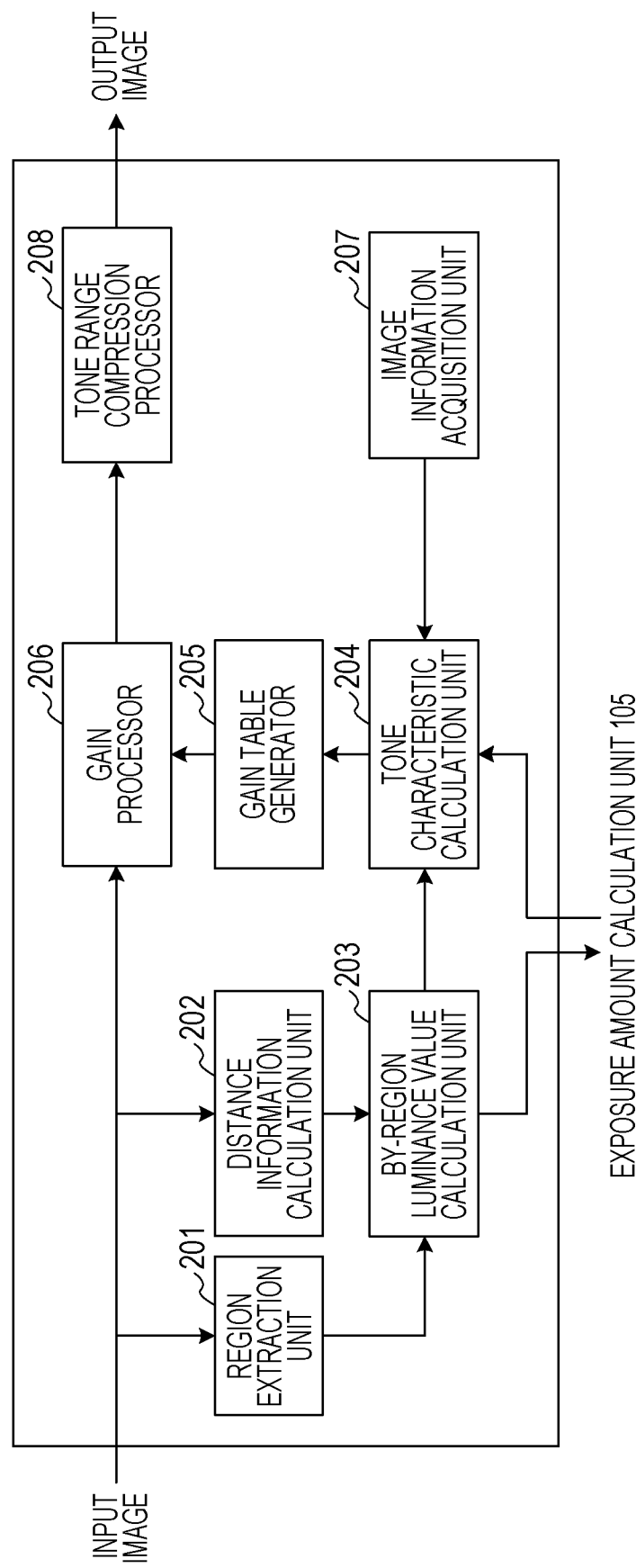

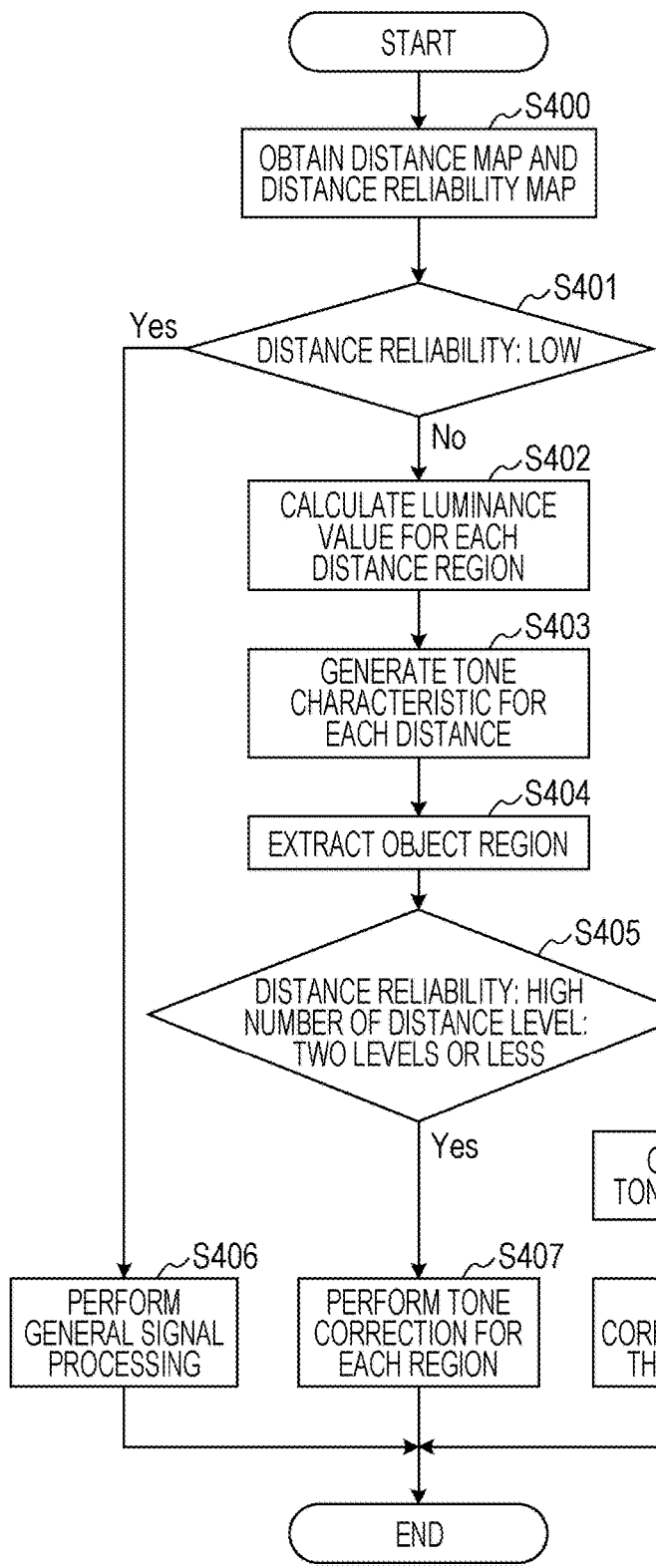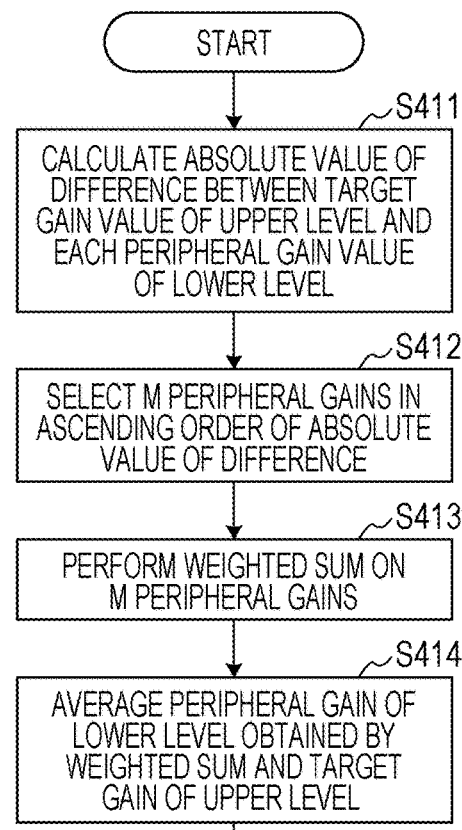
FIG. 4A
FIG. 4B

IMAGE PROCESSING APPARATUS, IMAGE PROCESSING METHOD, AND STORAGE MEDIUM

BACKGROUND

Field of the Disclosure

The present disclosure generally relates to image processing and, more particularly, an image processing apparatus, an image processing method, a storage medium, and to image processing in an imaging device, the image processing including performing tone correction on an image signal obtained by image capture.

Description of the Related Art

Image processing for extending the dynamic range of an input signal and compressing the tone range of an output signal, such as dodging processing or high dynamic range (HDR) processing that are for correcting contrast for each portion of an image, is known. Concerning such processing, one technique outputs an image having suitable gradations for a scene by applying distance information in addition to luminance information of objects to exposure control or tone correction.

Japanese Patent Laid-Open No. 2011-175529 discloses a technique for obtaining a depth distance and a characteristic quantity for each region of an image and applying image processing in accordance with a processing degree for each region of the image.

Japanese Patent Laid-Open No. 2008-067071 discloses a technique for selecting one of the gradation conversion characteristics predetermined by using an image characteristic quantity, which is extracted based on an extraction characteristic that is set in accordance with focal length information, and a focal length and for controlling gradation.

With the configuration disclosed in Japanese Patent Laid-Open No. 2011-175529, because image processing in accordance with a processing degree is applied to each region of an image, there is a possibility that the image appears unnatural due to, for example, gradation inversion depending on the scene of the image.

With the configuration in which a gradation conversion characteristic is selected according to a focal length as disclosed in Japanese Patent Laid-Open No. 2008-067071, it is difficult to perform appropriate gradation processing for each scene, such as a scene including objects with different distances.

SUMMARY

According to one or more aspects of the present disclosure, an image processing apparatus includes an obtaining unit configured to obtain distance information indicating a distance to each of one or more objects of an image, an extraction unit configured to perform grouping of the one or more objects in accordance with the distance to each object and to extract a plurality of object regions of the image in accordance with the grouping, a determination unit configured to determine, in accordance with a number of the plurality of object regions extracted by the extraction unit, whether to perform tone conversion by applying a same tone characteristic to the image as a whole or to perform tone conversion by applying different tone characteristics for respective regions of the image, a setting unit configured to set a tone characteristic, and a conversion unit configured to perform tone conversion on the image in accordance with a determination result of the determination unit.

Further features of the present disclosure will become apparent from the following description of exemplary embodiments with reference to the attached drawings.

BRIEF DESCRIPTION OF THE DRAWINGS

FIG. 2A is a block diagram illustrating a configuration of an image processor according to one or more aspects of the present disclosure.

FIGS. 4A and 4B are operation processing flowcharts according to one or more aspects of the present disclosure.

DESCRIPTION OF THE EMBODIMENTS

Embodiments of the present disclosure will now be described in detail with reference to the accompanying drawings. It should be noted that a digital camera is used as an example in the following description, but the present disclosure can be applied to other portable devices having imaging functionality.

In one or more aspects of the present disclosure, tone processing with exposure control or dodging processing is performed by utilizing information on a photographic scene, such as object region detection information, distance information, and shooting condition information. It should be noted that distant view imaging, which is one type of scene that may show the effect most markedly, is assumed in the description of one or more aspects of the present application, however the one or more aspects of the present disclosure can be applied to other types of scenes.

Figure 1:
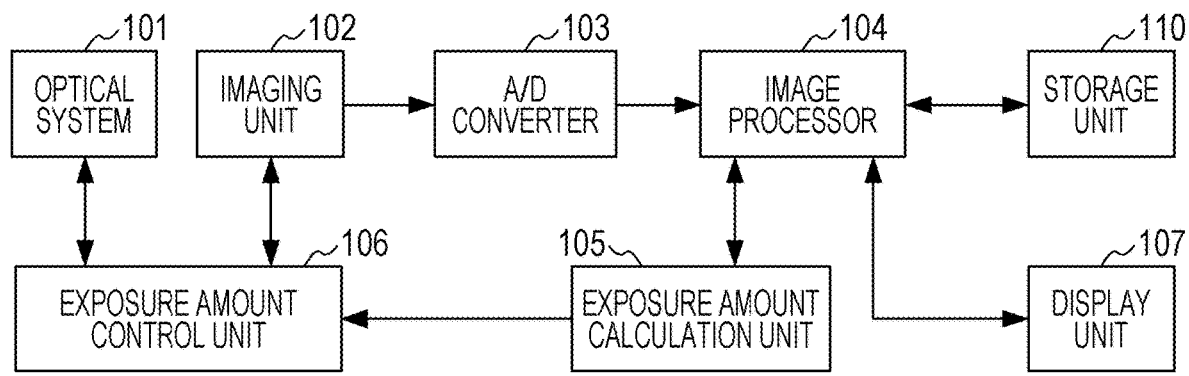
FIG. 1 is a block diagram illustrating a configuration of an image processing apparatus according to one or more aspects of the present disclosure.

FIG. 1 is a block diagram illustrating a configuration of an image processing apparatus according to one or more aspects of the present disclosure. An optical system 101 includes a lens group constituted by a zoom lens and a focusing lens, an aperture adjustment device, and a shutter device. The optical system 101 adjusts a magnification, an in-focus position, or light intensity of an object image that reaches an imaging unit 102. The imaging unit 102 is a photoelectric conversion element, such as a charge-coupled device (CCD) or a complementary metal-oxide semiconductor (CMOS) sensor, that photoelectrically converts a light beam of an object having passed through the optical system 101 into an electrical signal.

An analog to digital (A/D) converter 103 converts an input image signal into a digital image signal.

An image processor 104, which may include one or more processors and one or more memories, performs tone processing according to one or more aspects of the present disclosure, as well as general signal processing. The image processor 104 perform not only image processing on an image output from the A/D converter 103, but also the same image processing on an image read from a storage unit 110.

An exposure amount calculation unit 105 calculates an exposure amount at the time of capturing an image, in order to obtain a most suitable input image for tone processing according to the present disclosure. The processing result of the image processor 104 is input to the exposure amount calculation unit 105, and an exposure amount calculated and output by the exposure amount calculation unit 105 is input to an exposure amount control unit 106.

In order to achieve an exposure amount calculated by the exposure amount calculation unit 105, the exposure amount control unit 106 controls the optical system 101 and the imaging unit 102 to control the aperture, shutter speed, and analog gain of the sensor.

A display unit 107 functions as an electronic viewfinder (EVF) by displaying, one after another, images output from the image processor 104 on a display member such as a liquid crystal display (LCD).

The storage unit 110 has a function of recording images. The storage unit 110 may include, for example, an information storage medium such as a memory card equipped with a semiconductor memory or an information storage medium using a package accommodating a rotational recording body such as a magneto-optical disk.

FIG. 2A is a block diagram illustrating a configuration of the image processor 104.

Figure 3A:
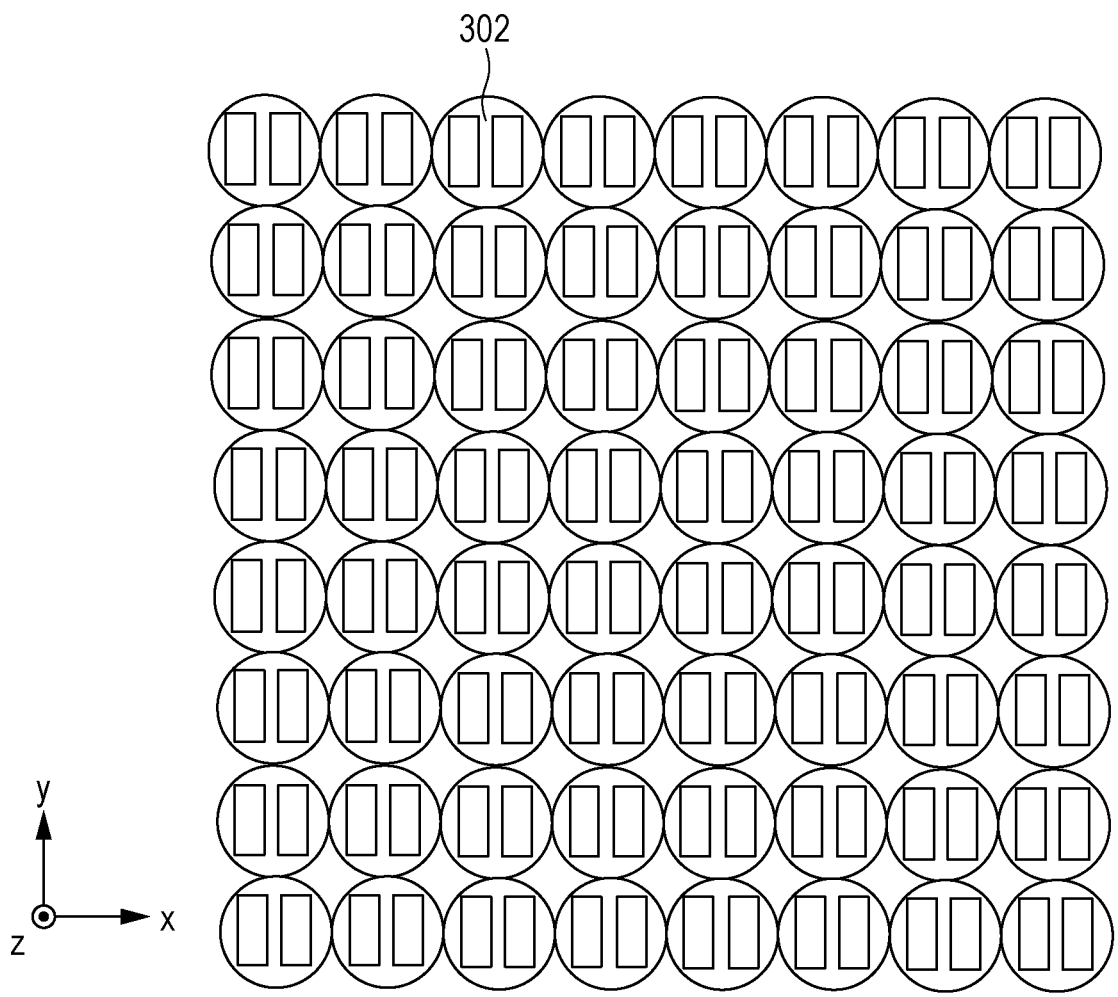
FIGS. 3A and 3B illustrate a configuration of an imaging unit according to one or more aspects of the present disclosure.
Figure 3B:
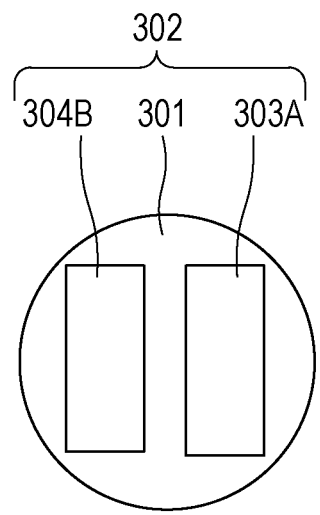

FIG. 3A illustrates a pixel array configuration of the imaging unit 102. FIG. 3B illustrates an enlarged pixel 302, which is constituted by a micro lens 301 and a pair of photoelectric converters 303A and 304B. As illustrated in FIG. 3A, in the imaging unit 102 the pixels 302 are two-dimensionally and regularly arranged.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Tone processing performed on an image will now be described with reference to a flowchart in FIG. 4A.

In step S400, a distance information calculation unit 202 generates from a captured image a distance map (distance image) indicating distances to one or more respective objects in an image and a reliability map (distance reliability image). The distance information generally corresponds to the distance (object distance) from the image processing apparatus to respective objects.

Figure 5:
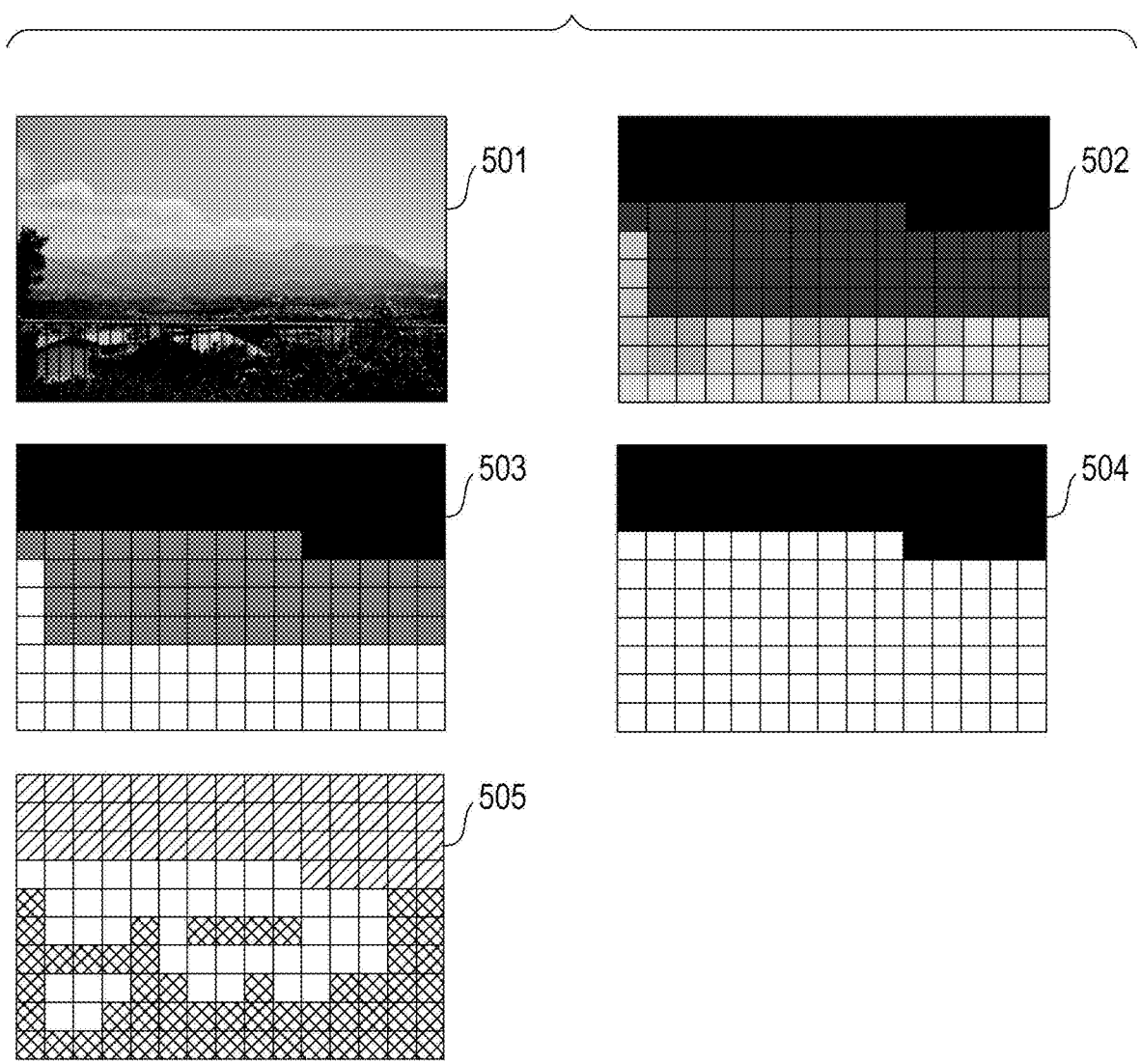
FIG. 5 illustrates examples of an input image, a distance image, a distance reliability image, and a region extraction image according to one or more aspects of the present disclosure.

An image 501 in FIG. 5 represents a captured image. The lower part of the image (in the vicinity of the iron fence) has high contrast, whereas the middle part of the image (buildings and mountains) is hazy and has low contrast. For the image 501, processing for generating a distance map indicating distribution of distances to one or more objects and a corresponding reliability map is performed. The distance map and the corresponding reliability map are generated according to phase differences between object images caused by light beams coming from different regions of a pupil of an imaging optical system.

Here, reliability is a value indicating how easily the above-mentioned phase difference (amount of image shift) can be detected in each region. The distance calculated in a region in which it is difficult to detect the amount of image shift is likely to be inaccurate, and thus the reliability is low. A region in which it is difficult to detect the amount of image shift is a region in which the pattern of an object is relatively plain, such as the sky or a car body. Such a region is detected, and low reliability is assigned to the region. As an index for determining whether the pattern of an object is relatively plain, an edge integral value can be employed.

More specifically, the edge integral value is obtained by integrating absolute values of edge amplitude of pixels in small blocks of the image 501. The calculated edge integral value is compared with a predetermined threshold. When the calculated edge integral value is smaller than the threshold, it is determined that the pattern of the region is relatively plain and lower reliability than that of a region with a more complex pattern is assigned to the region. By repeating the above-described calculation method for each divided small block, reliability map for distribution of distances to one or more objects can be generated.

An image 502 in FIG. 5 represents the generated distance map, which shows that the whiter a pixel value, the closer the object to an imaging device (i.e., shorter distance to object). An image 503 is obtained by performing, on the image 502 of the distance map, grouping of distances with more than one preset threshold and reducing the number of tones. According to the grouping, more than one object region is extracted from the image 501.

For example, in a case where the number of tones of the image 502 is expressed as 8 bit, by determining three thresholds Th0=63, Th1=127, and Th2=191 at regular intervals, the image is grouped into three regions as seen in the image 503. An image 504 represents the reliability map, which indicates that the white region has a higher reliability of distance value shown in the images 502 and 503, whereas the black region has lower reliability due to the relatively plain patterns of one or more objects. It should be noted that the threshold for grouping may be set at a number other than three, and may not be at even intervals.

In step S401, it is determined whether reliability of a distance to an object is low by using the reliability map generated in step S400. More specifically, in one case where a region with high reliability does not account for a certain rate (for example, more than half) of the image 504, the reliability of distance to object is determined to be low and the process flow proceeds to step S406, and the other case proceeds to step S402.

In step S402, a by-region luminance value calculation unit 203 generates a luminance histogram for each level of distance by using the distance map and the reliability map generated in step S400. More specifically, luminance values corresponding to a region with high reliability in the image 504 of the reliability map are obtained from the image 501 and accumulated for each level of distance so as to form a histogram.

Figure 6A:
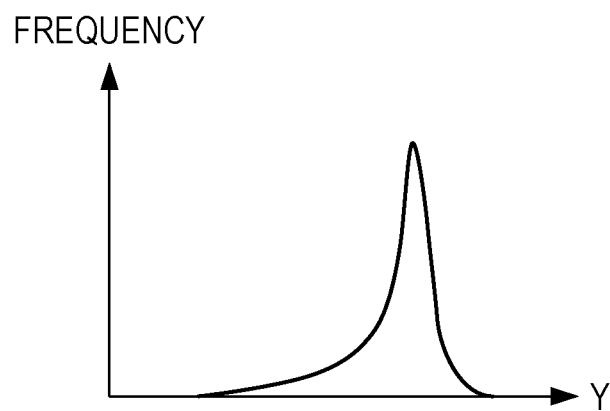
FIGS. 6A and 6B are luminance histograms for respective regions according to one or more aspects of the present disclosure.
Figure 6B:
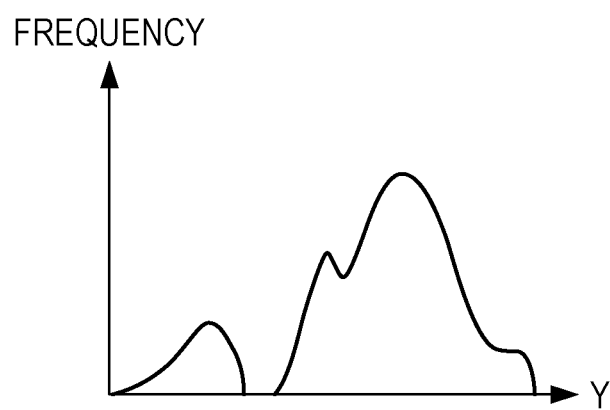

FIGS. 6A and 6B are histograms obtained as the result of accumulation of luminance values.

FIG. 6A illustrates an example luminance histogram for a middle-distance region, which is an object region indicated with gray in the image 503. FIG. 6B illustrates an example luminance histogram for a short-distance region, which is an object region indicated with white in the image 503.

In step S403, a tone characteristic calculation unit 204 sets a tone correction characteristic in accordance with the histogram calculated for each distance region in step S402. As an example of a method for setting a tone correction characteristic, one or more aspects of the present disclosure employ a method in which highlight/shadow points are determined for a respective high luminance range and low luminance range, and contrast is improved accordingly.

Figure 7A:
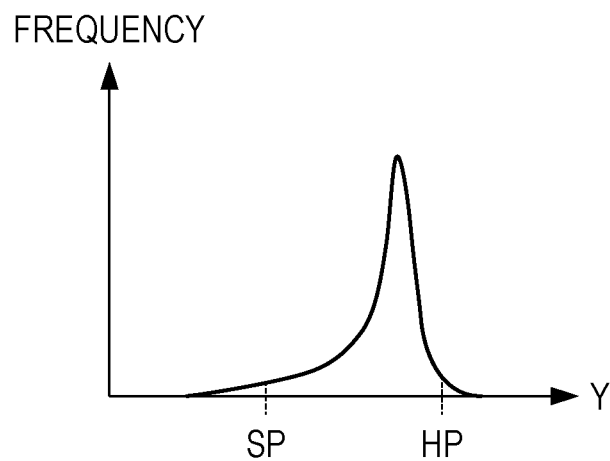
FIGS. 7A and 7B are luminance histograms for respective regions according to one or more aspects of the present disclosure.
Figure 7B:
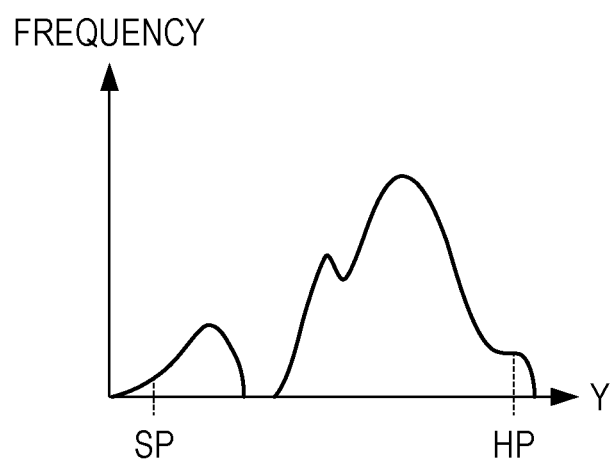
Figure 8A:
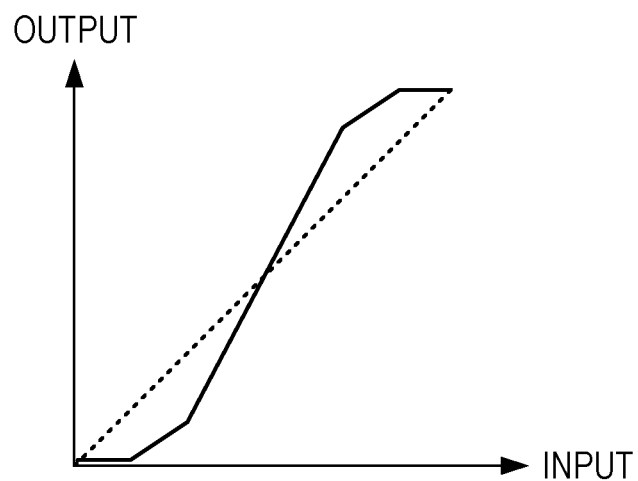
FIGS. 8A and 8B are graphs illustrating tone characteristics according to one or more aspects of the present disclosure.
Figure 8B:
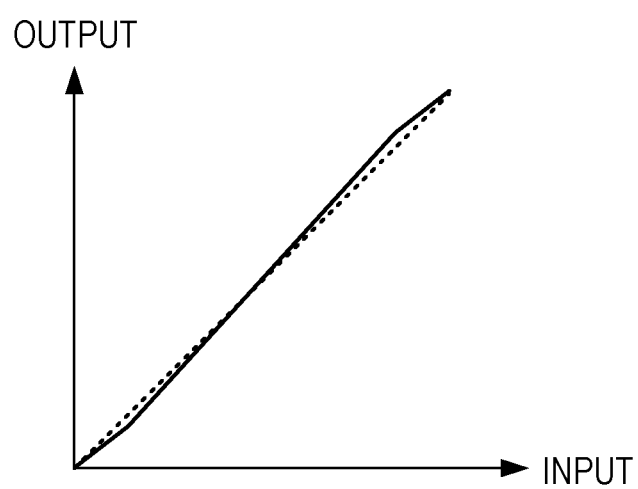

To be specific, as illustrated in FIGS. 7A and 7B, firstly, a minimum value (HP) of luminance among luminance values of one percent of pixels in descending order from the maximum luminance value and a maximum value (SP) of luminance among luminance values of one percent of pixels in ascending order from the minimum luminance value are calculated for each histogram. In addition, a characteristic in which the luminance value of HP is equal to a luminance saturation value or a value close to the luminance saturation value, and the luminance value of SP is equal to 0 or a value close to 0 is generated. FIGS. 8A and 8B illustrate the resultant characteristics. The characteristic for the middle part of the image 501 illustrated in FIG. 8A appears to be a characteristic to improve contrast (a characteristic in which the degree of contrast enhancement is high). In contrast, the characteristic for the lower part of the image 501 illustrated in FIG. 8B appears to be a characteristic not for greatly adjusting contrast (a characteristic in which the degree of contrast enhancement is low).

In step S404, a region extraction unit 201 performs processing for extracting a region indicating a specific object from the image 501 and identifying the region. The extraction method is a method in which by using various kinds of image capturing information obtained by the imaging device when capturing an image in addition to a characteristic quantity possessed by the image, regions such as a sky region and a natural object region, for example, a region of a conifer, are distinguished for each block. An image 505 in FIG. 5 represents the result of the object identification, where the shaded part indicates a sky region and the mesh part indicates a region extracted and identified as a natural object region.

In step S405, processing for determining whether tone correction processing is performed on each region of the image 501 or performed uniformly throughout the image 501 is performed. In the determination method, firstly, it is determined whether a region (white) with high reliability of the image 504 of the reliability map generated in step S401 accounts for a predetermined ratio or more. For example, distance reliability is determined to be high when a region with high reliability accounts for 50 percent or more of the number of pixels. Next, it is determined whether the number of distance grouping levels of the image 503 is equal to or less than a predetermined number (for example, two). In one case where the two above-described determinations are both positive, the image 501 is determined to likely be of a scene of the cardboard effect in which there are not many gradual changes in distance and which is divided into a short-distance area and a long-distance area, and control for performing tone correction for each region is performed. In other cases, it is determined that, for example, if tone correction is altered for each region of an image of a scene including a region with gradual changes in distance, the image is likely to be unnatural due to gradation inversion, and control for applying the same tone characteristic to the image as a whole is performed. In other words, it is determined, based on the number of object regions that are grouped in accordance with distance to object, whether to perform tone conversion by applying the same tone characteristic to the whole image or to perform tone conversion by applying different tone characteristics for respective regions of the image. According to the determination result, tone conversion is performed as described below.

In step S406, the image processor 104 performs general signal processing. The tone range of the output of the processing is compressed by a tone range compression processor 208 into a predetermined output range by employing, for example, gamma conversion. The aim of the tone range compression is not to perform tone correction according to distance information when most patterns of one or more objects in the image 501 are relatively plain and thus the distance reliability is low. This may reduce the occurrence of adverse effect such as generating an undesired tone characteristic by using incorrect distance information and unnaturally correcting contrast for an object at a long distance where contrast is very weak.

Figure 2B:
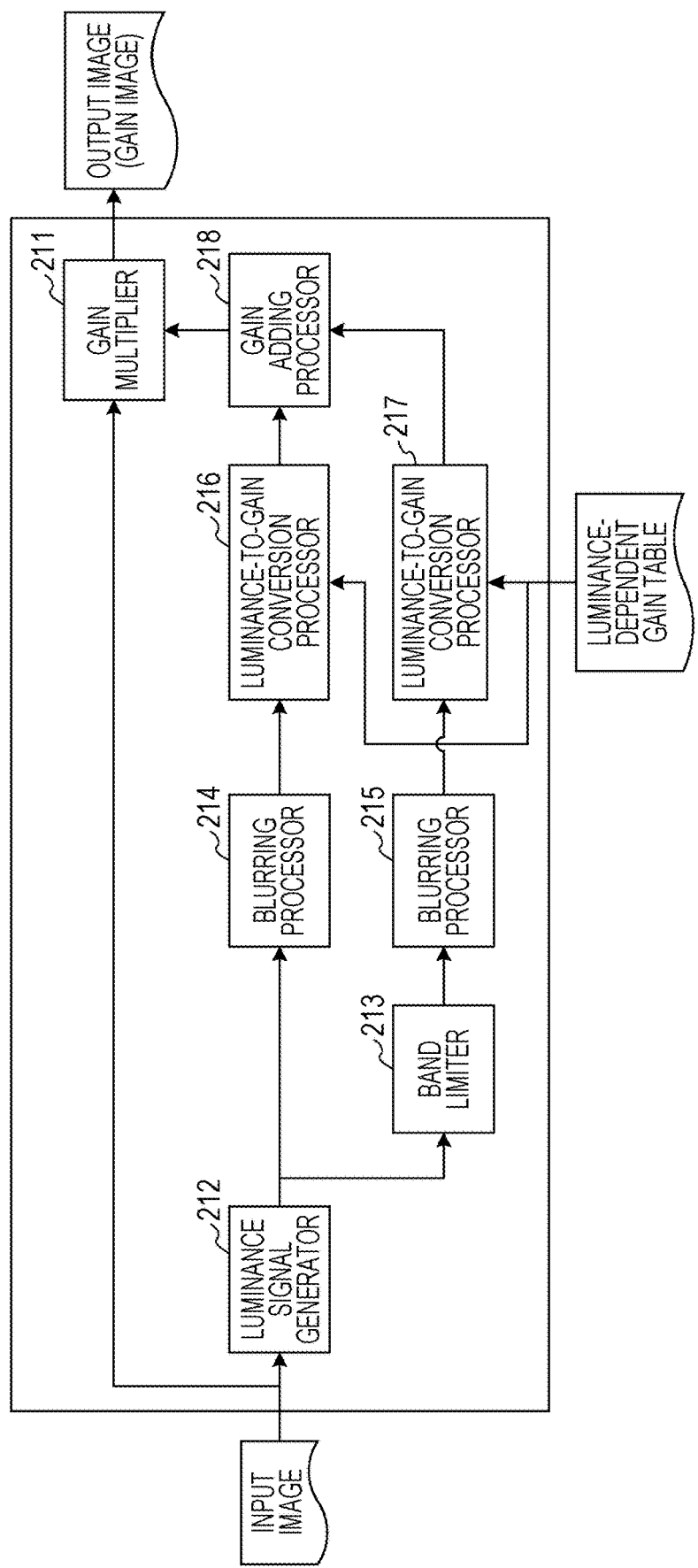
FIG. 2B is a block diagram illustrating a configuration of a gain processor.

In step S407, the tone characteristic for each distance region generated in S403 is applied for each region by employing a dodging method. Referring to FIG. 2B, which is a block diagram illustrating a configuration of a gain processor 206, a method of tone correction will be described in detail below.

A luminance signal generator 212 generates a luminance signal from the image 501. A band limiter 213 filters, with a preset low-pass filter (LPF), the luminance signal generated by the luminance signal generator 212.

Blurring processors 214 and 215 perform predetermined blurring processing on images output from the luminance signal generator 212 and the band limiter 213. The aim of this processing is to reduce gain sensitivity for fine texture and maintain contrast more appropriately. However, it is considered that a region around a boundary between a high luminance region and a low luminance region should not be subjected to a desired gain in dodging gain processing and that a false contour appear noticeably. It is thus better not to perform blurring processing on a boundary between a high luminance region and a low luminance region. Hence, blurring processing needs to be performed while the edge with a great luminance difference is being maintained.

Luminance-to-gain conversion processors 216 and 217 convert the luminance images that are respectively output from the blurring processors 214 and 215 into gain images by using a luminance-dependent gain table generated by a gain table generator 205.

A method for generating the luminance-dependent gain table is now described. In terms of the tone characteristics shown in FIGS. 8A and 8B, horizontal axes of graphs represent input luminance and vertical axes represent output luminance. Slopes of lines represent gain amount. The tone characteristic is expressed as follows by using gain amount Gain: output luminance=Gain×input luminance; therefore, Gain=output luminance/input luminance. In this manner, a table representing gain amount in relation to input luminance is generated as the luminance-dependent gain table.

A gain image is an image in which, in the case where a pixel located at the most upper left position of an image is represented by (0,0) and a location of a pixel of an input image is represented by (x,y), a gain output from an input signal Yin(x,y) is represented by Gain(x,y). In other words, Gain(x,y) is expressed by the following equation (1) using a gain table function GainTbl as shown below.

$$Gain(x,y)=GainTbl(Yin(x,y)) \quad (1)$$

The above-described Gain(x,y) of a gain image is a gain that corresponds to a pixel located at (x,y) of an input image.

Figure 2C:
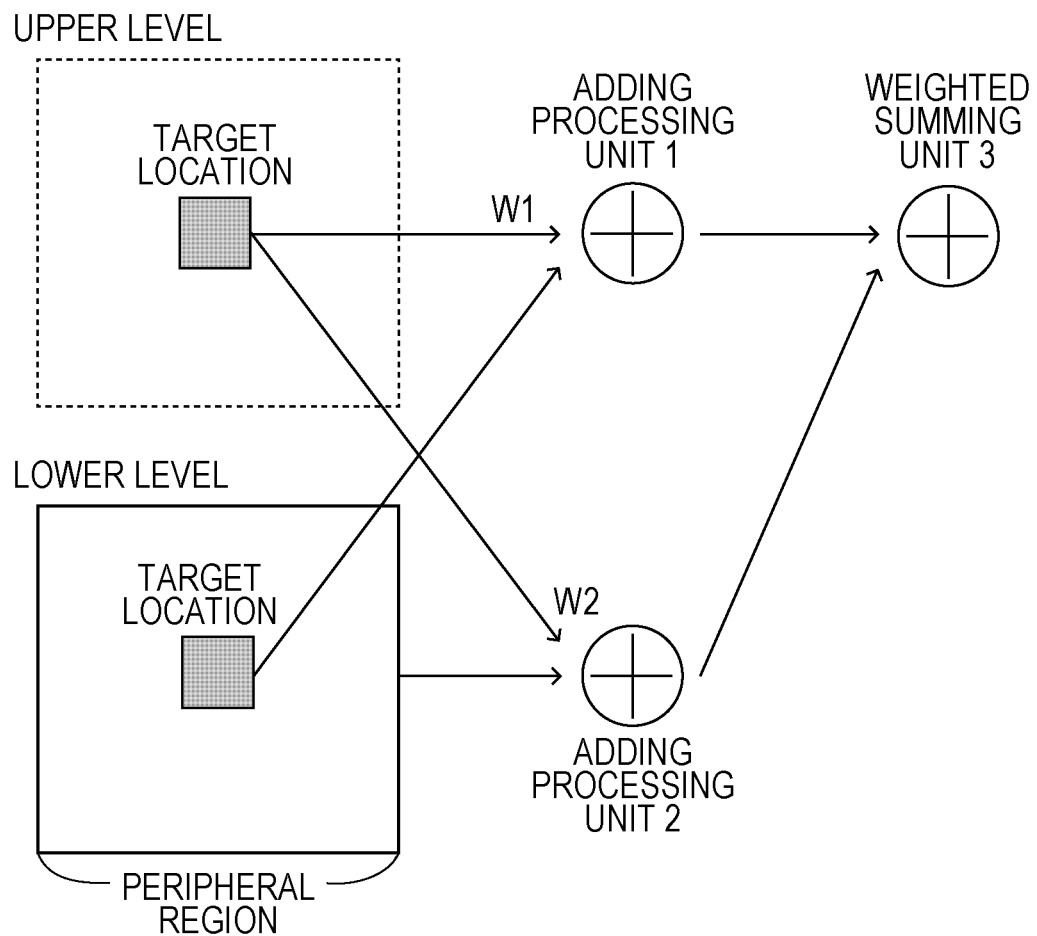
FIG. 2C is a diagram illustrating a configuration of a gain adding processor.

A gain adding processor 218 performs processing for adding the output gain images from the luminance-to-gain conversion processors 216 and 217 together for each pixel. FIG. 2C is a diagram illustrating a configuration of the gain adding processor 218. The gain image of an upper level in which band limitation has not been performed on the input luminance signal and the gain image of a lower level in which low frequency components have been kept are added together.

An adding processing unit 1 averages (performs a weighted sum with weight W1=0.5 on) a gain (hereinafter referred to as a target gain) of a target location of the upper level and a target gain of the target location of the lower level. However, using only the result of this process may cause the above-described false contour.

In an adding processing unit 2, the target gain of the upper level and gains (hereinafter, referred to as peripheral gains) of a peripheral region of the lower level are used. Here, peripheral region is a collection of pixels within a predetermined range extending around a target location in directions to top, bottom, left, and right. The aim of employing the adding processing unit 2 is to reduce the above-described false contour.

FIG. 4B is a flowchart illustrating contents of processing performed by the adding processing unit 2. The processing will be described in detail below.

In step S411, an absolute value of difference between the target gain value of the upper level and each peripheral gain value of the lower level is calculated.

In step S412, M peripheral gains are selected in ascending order of the absolute value of difference. Here, M is a predetermined number. With this processing, peripheral gains of the lower level that have gain values close to the target gain value of the upper level can be selected. It should be noted that although in one or more aspects of the present disclosure the method in which, when gains are selected, a predetermined number of gains are selected in ascending order of the absolute value of difference is employed, other methods may also be employed. For example, in order to reduce the computational cost, all gains whose absolute value of difference is equal to or less than a predetermined threshold may be selected.

In step S413, a weighted sum is performed on the M selected peripheral gain values. Here, the weight for a weighted sum is determined by the following equation (2).

$$W(k) = \frac{A}{|GL(k) - GH|} \quad (2)$$

In equation (2), GL(k) represents a peripheral gain having the kth position in order of the selected peripheral gains of the lower level. W(k) represents a weight for a weighted sum corresponding to GL(k). GH represents the target gain of the upper level. A is a predetermined constant. As seen in equation (2), weight W(k) increases as the difference between a peripheral gain of the lower level and the target gain of the upper level decreases.

Subsequently, after a weight W(k) for each peripheral gain is calculated with equation (2), a weighted sum is performed according to the following equation (3).

$$GL' = \frac{\sum_{k=1}^{M} \{W(k) \times GL(k)\}}{\sum_{k=1}^{M} W(k)} \quad (3)$$

In equation (3), GL' represents a gain of the lower level after a weighted sum has been performed.

In step S414, the peripheral gain GL' of the lower level obtained by a weighted sum and the target gain GH of the upper level are averaged (a weighted sum is performed with weight W2=0.5), and the resultant gain value is output from the adding processing unit 2.

Referring back to FIG. 2C, a weighted summing unit 3 performs a weighted sum on the result of the adding processing unit 1 and the result of the adding processing unit 2, and the weight for this weighted sum is determined according to the gain difference between the target location of the upper level and the target location of the lower level. More specifically, as the difference value between a target gain of the upper level and a target gain of the lower level increases, the weight is determined by depending more on the result of the adding processing unit 2. This is because using the result of the adding processing unit 2 in the vicinity of an edge, where luminance difference and gain difference are both greater, is desirable since this results in reducing the occurrence of a false contour. Conversely, using the result of the adding processing unit 2 in a texture portion, where a gain difference is smaller, results in decreased contrast of an image. Since a false contour does not become apparent when a gain difference is smaller, it is desirable to use the result of the adding processing unit 1 to hinder the decrease in contrast.

Referring back to FIG. 2B, a gain multiplier 211 multiplies the original image (the image 501) having been subjected by the image processor 104 to predetermined signal processing by the generated gain image. The output of the gain multiplier 211 is subjected to compression of tone range into a predetermined output range by the tone range compression processor 208 by employing, for example, gamma conversion processing.

Figure 9:
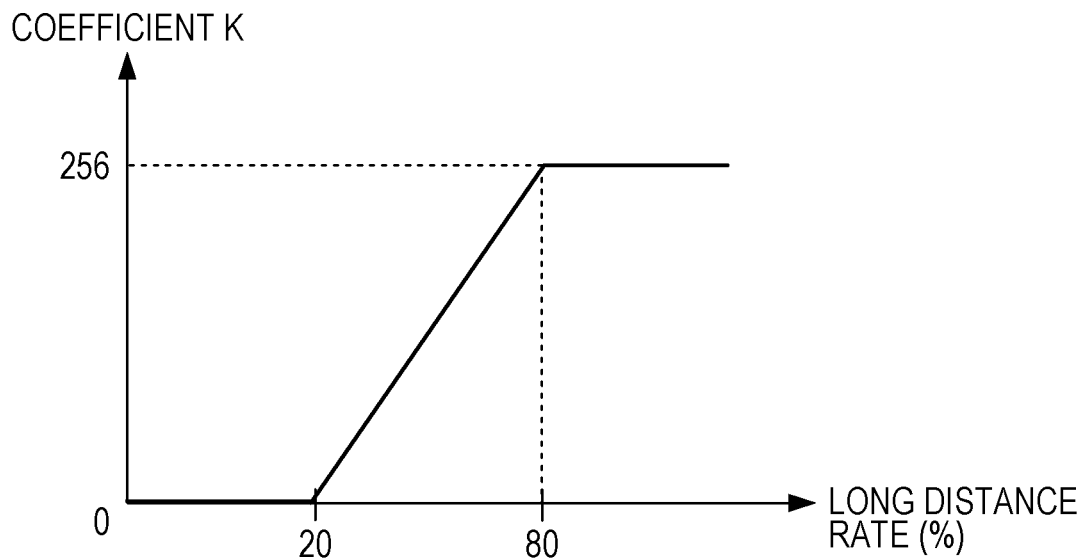
FIG. 9 is a graph illustrating coefficient K for generating a tone characteristic according to one or more aspects of the present disclosure.
Figure 10:
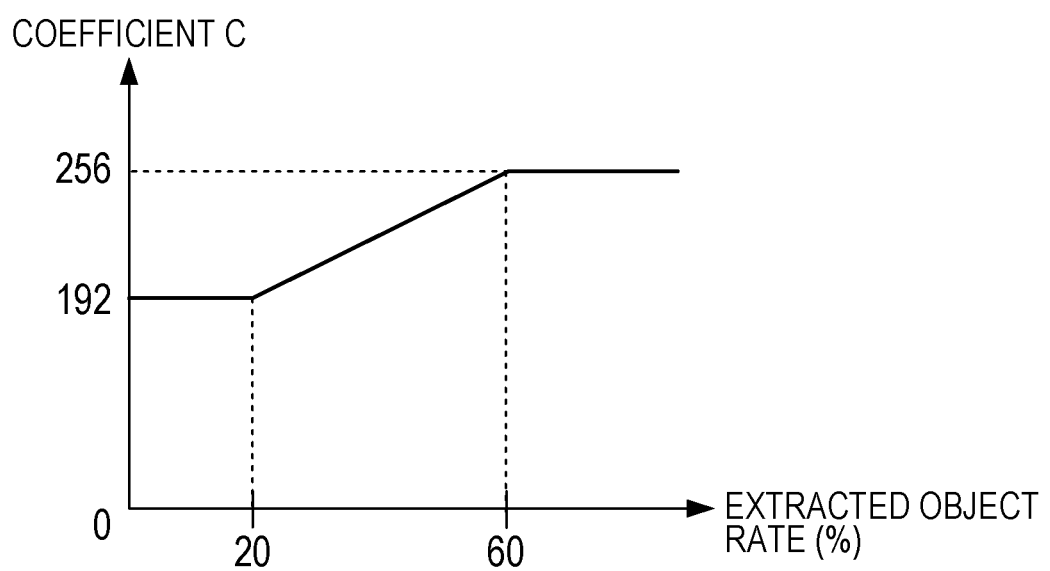
FIG. 10 is a graph illustrating coefficient C for generating a tone characteristic according to one or more aspects of the present disclosure.

Referring back to FIG. 4A, in step S408 one tone characteristic is generated by performing a weighted sum on the tone characteristics generated for respective distance regions in step S403 in accordance with the distribution of distances and the result of region extraction. To be specific, for the images 503 and 504, the distance information calculation unit 202 first calculates the ratio of the number of pixels of the long distance region to the total number of pixels of a region with high reliability. According to the ratio, a weighted sum coefficient in relation to a tone characteristic is calculated. Referring to FIGS. 9 and 10, a method for calculating a coefficient will be described below.

FIG. 9 is a graph illustrating a method for calculating a coefficient using distance information, in which horizontal axis represents the ratio of the above-described long distance region, and vertical axis represents coefficient K. It can be seen that as the ratio of the long distance region is greater, coefficient K becomes greater.

FIG. 10 is a graph illustrating a method for calculating coefficient C that adjusts coefficient K using the result of object region extraction generated in step S404. The ratio of an object region (the sky or a natural object) of the image 505 is calculated, and then coefficient C as illustrated in FIG. 10 is calculated according to the ratio.

In relation to the two coefficients K and C, weighted sum coefficient K' is lastly calculated with the following equation (4).

$$K' = K \times \frac{C}{256} \quad (4)$$

The aim of this calculation is to increase weight for a tone characteristic of long distance region in order to adjust contrast more, because as a region including the sky and/or a natural object is greater, the scene including the region tends more to be a landscape view or a distant view, where the decrease in contrast of, in particular, a natural object including a texture is likely to be apparent.

Using the above-described weighted sum coefficient K', when a tone characteristic of the middle-distance region illustrated in FIG. 8A is represented by A and a tone characteristic of the short-distance region illustrated in FIG. 8B is represented by B, a tone characteristic for applying to the whole image is calculated by the following equation (5).

$$\text{Tone characteristic:} \frac{A \times K' + B \times (256 - K')}{256} \quad (5)$$

Figure 11:
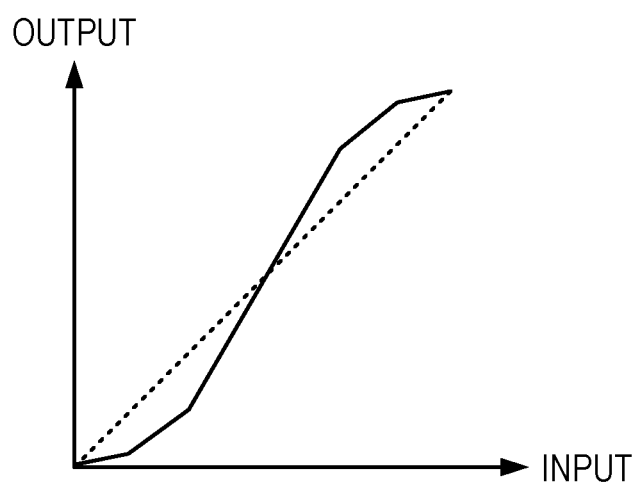
FIG. 11 is a graph illustrating a tone characteristic according to one or more aspects of the present disclosure.

FIG. 11 is a graph illustrating the resultant tone characteristic. It can be seen that two tone characteristics A and B are subjected to a weighted sum and the contrast correcting amount of the calculated tone characteristic is slightly reduced as compared with the tone characteristic A. The generated tone characteristic is converted by the gain table generator 205 into a gain table as performed in step S407.

In step S409, the gain table generated in step S408 is applied to the whole image 501. Since the specific method of tone correction is the same as that of step S407, the description is omitted.

Lastly, an image subjected by the tone range compression processor 208 to compression of tone range is output to the display unit 107 and the storage unit 110.

As described above, with one or more aspects of the present disclosure, by using distance information and object region information when correcting contrast of landscape scene where distance differences are relatively great, correction with less excess and deficiency can be realized.

It should be noted that although in one or more aspects of the present disclosure a configuration in which generating and adjusting a tone characteristic using a captured image is described, the configuration is not limited to this. The adjusting amount of tone characteristic may be calculated before capturing an image and applied for exposure control when capturing an image. For example, an upper limit of the maximum gain amount for tone correction is predetermined, and in a case of exceeding the upper limit, a gain amount can be suppressed by increasing an exposure.

Furthermore, it should be noted that although in one or more aspects of the present disclosure a method in which a steep tone characteristic is applied in order to improve contrast, other method may be employed. For example, when a gain image of a region of a long distance is generated in the gain adding processor 218, contrast may be improved by performing control for rendering the weight for a gain image of the lower level greater (rendering values of W1 and W2 less than 0.5) and then performing a weighted sum.

Moreover, although in one or more aspects of the present disclosure a configuration in which a tone characteristic is controlled based on absolute distances between an imaging device and one or more objects is described, the tone characteristic may be controlled in additional consideration of a focal length. For example, referring to a focal length, an aperture value, or the like that are obtained by an image information acquisition unit 207, for a scene where a focal length is short and a depth is shallow, a tone characteristic for which priority is given to a short-distance region focused without depending on a distribution of distances may be applied or a gain image according to the same priority may be generated.

Further, although in one or more aspects of the present disclosure the sky and a natural object are taken as examples of one or more objects to be extracted in the description, a configuration in which a person is detected and tones are controlled may be applied. For a scene where a person is present, a tone characteristic for which priority is given to a person's face region may be applied.

Preferred embodiments and other aspects of the present disclosure have been described above. The present disclosure is, however, not limited to the embodiments, and various modifications may be made within the scope of the disclosure.

OTHER EMBODIMENTS

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that may include one or more circuits or circuitry (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits or circuitry to perform the functions of one or more of the above-described embodiment(s). The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-098377 filed May 17, 2017, which is hereby incorporated by reference herein in its entirety.

What is claimed is:

1. An image processing apparatus comprising:
   at least one processor or circuit configured to function as:
   an obtaining unit configured to obtain distance information indicating a distance to each of one or more objects of an image;
   an extraction unit configured to perform grouping of the one or more objects in accordance with the distance to each object and to extract a plurality of object regions of the image in accordance with the grouping;
   a determination unit configured to determine, in accordance with a number of the plurality of object regions extracted by the extraction unit, whether to perform tone conversion by applying a same tone characteristic to the image as a whole or to perform tone conversion by applying different tone characteristics for respective regions of the image;
   a setting unit configured to set a tone characteristic; and
   a conversion unit configured to perform tone conversion on the image in accordance with a determination result of the determination unit.

2. The image processing apparatus according to claim 1, wherein
   when the number of the plurality of object regions is equal to or less than a predetermined number, the determination unit determines to perform tone conversion by applying the same tone characteristic to the whole image.

3. The image processing apparatus according to claim 1, wherein
   in a case where the determination unit determines to perform tone conversion by applying the same tone characteristic to the whole image, the setting unit sets the tone characteristic for each of the plurality of object regions in accordance with luminance, and sets the tone characteristic applied by performing a weighted sum on tone characteristics, each of which is the tone characteristic, in accordance with sizes of the plurality of object regions.

4. The image processing apparatus according to claim 1, wherein
   in a case where reliability of the distance information is low, the determination unit determines to perform tone conversion by applying the same tone characteristic to the whole image regardless of the number of the plurality of object regions extracted by the extraction unit.

5. The image processing apparatus according to claim 1, wherein the at least one processor or circuit further function as:
   an object identification unit configured to identify the plurality of object regions extracted by the extraction unit, wherein
   the setting unit controls the tone characteristic in accordance with an identification result of the object identification unit.

6. An image processing method comprising:
   obtaining distance information indicating a distance to each of one or more objects of an image;
   performing grouping of the one or more objects in accordance with the distance to each object and extracting a plurality of object regions of the image in accordance with the grouping;
   determining, in accordance with a number of the plurality of object regions extracted, whether to perform tone conversion by applying a same tone characteristic to the image as a whole or to perform tone conversion by applying different tone characteristics for respective regions of the image;
   setting a tone characteristic; and
   performing tone conversion on the image in accordance with a determination result in the determining.

7. A non-transitory computer-readable storage medium storing a program for causing a computer to execute an image processing method comprising:
   obtaining distance information indicating a distance to each of one or more objects of an image;
   performing grouping of the one or more objects in accordance with the distance to each object and extracting a plurality of object regions of the image in accordance with the grouping;
   determining, in accordance with a number of the plurality of object regions extracted, whether to perform tone conversion by applying a same tone characteristic to the image as a whole or to perform tone conversion by applying different tone characteristics for respective regions of the image;
   setting a tone characteristic; and
   performing tone conversion on the image in accordance with a determination result in the determining.

8. An image processing apparatus comprising:
   at least one processor or circuit configured to function as:
   an obtaining unit configured to obtain distance information indicating a distance to each of one or more objects of an image;
   an extraction unit configured to extract a plurality of object regions of the image in accordance with the distance information obtained by the obtaining unit;
   a conversion unit configured to perform tone conversion on the image, wherein
   the conversion unit performs the tone conversion by applying different tone characteristics for respective regions of the image in a case where a number of the plurality of object regions extracted by the extraction unit is a first number, and the conversion unit performs the tone conversion by applying a same tone characteristic to the image as a whole in a case where a number of the plurality of object regions extracted by the extraction unit is a second number that is greater than the first number.

9. The image processing apparatus according to claim 8, wherein
   in a case where reliability of the distance information is low, the conversion unit performs tone conversion by applying the same tone characteristic to the whole image regardless of the number of the plurality of object regions extracted by the extraction unit.

10. The image processing apparatus according to claim 8, wherein:
the at least one processor or circuit further function as:
an object identification unit configured to identify the plurality of object regions extracted by the extraction unit, wherein
the conversion unit controls tone characteristic of the tone conversion in accordance with an identification result of the object identification unit.

11. An image processing method comprising:
obtaining distance information indicating a distance to each of one or more objects of an image;
extracting a plurality of object regions of the image in accordance with a obtained distance;
performing tone conversion on the image, wherein
the tone conversion is performed by applying different tone characteristics for respective regions of the image in a case where a number of the plurality of object regions extracted is a first number, and the tone conversion is performed by applying a same tone characteristic to the image as a whole in a case where a number of the plurality of object regions extracted is a second number that is greater than the first number.

12. A non-transitory computer-readable storage medium storing a program for causing a computer to execute an image processing method comprising:
obtaining distance information indicating a distance to each of one or more objects of an image;
extracting a plurality of object regions of the image in accordance with a obtained distance;
performing tone conversion on the image, wherein
the tone conversion is performed by applying different tone characteristics for respective regions of the image in a case where a number of the plurality of object regions extracted is a first number, and the tone conversion is performed by applying a same tone characteristic to the image as a whole in a case where a number of the plurality of object regions extracted is a second number that is greater than the first number.

* * * * *